US011415695B2

(12) United States Patent
Maunz et al.

(10) Patent No.: US 11,415,695 B2
(45) Date of Patent: Aug. 16, 2022

(54) DISTANCE MEASURING SYSTEM WITH LAYOUT GENERATION FUNCTIONALITY

(71) Applicant: LEICA GEOSYSTEMS AG, Heerbrugg (CH)

(72) Inventors: Johannes Maunz, Widnau (CH); Patrick Rennhard, Buch am Irchel (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 855 days.

(21) Appl. No.: 16/276,499

(22) Filed: Feb. 14, 2019

(65) Prior Publication Data

US 2020/0025921 A1    Jan. 23, 2020

(30) Foreign Application Priority Data

Feb. 15, 2018   (EP) .................................... 18157030

(51) Int. Cl.
*G01S 17/10*       (2020.01)
*G01C 15/00*       (2006.01)
(Continued)

(52) U.S. Cl.
CPC ............ *G01S 17/10* (2013.01); *G01C 15/002* (2013.01); *G01C 15/02* (2013.01); *G01S 7/4813* (2013.01); *G01S 17/36* (2013.01); *G01S 17/48* (2013.01)

(58) Field of Classification Search
CPC ...... G01S 7/4813; G01S 7/4817; G01S 17/06; G01S 17/08; G01S 17/10; G01S 17/36;
(Continued)

(56) References Cited

U.S. PATENT DOCUMENTS

RE46,672 E   *   1/2018   Hall ...................... G01S 7/4811
2006/0201006 A1*   9/2006   Burlingham ............ G01S 17/88
33/284

(Continued)

FOREIGN PATENT DOCUMENTS

CN          107390681 A   * 11/2017   ............. G01C 21/20
DE     10 2010 030916 A1     1/2012
KR        20170074542 A   * 12/2015

OTHER PUBLICATIONS

"Hong, Ko, and Kim, "VIP: Veloicity Updating Iterative Closest Point Algorithm", May 2010" (Year: 2010).*
(Continued)

*Primary Examiner* — Luke D Ratcliffe
*Assistant Examiner* — Woohyeong Cho
(74) *Attorney, Agent, or Firm* — Maschoff Brennan

(57) ABSTRACT

A Distance Measuring (DM)-system comprising a DM-device comprising a measuring beam unit configured for determining a distance between an object and the DM-device by transmitting a measuring beam, and an Inertial Measurement Unit (IMU) configured for determining an absolute first rotational position of the DM-device with respect to a first axis being parallel to the measuring beam, and an absolute second rotational position of the DM-device with respect to a second axis parallel to the gravity field. The DM-system also includes a computer unit configured for receiving from the DM-device a plurality of measured distance values, an absolute first rotational position of the DM-device at the time of a respective distance measurement, and an absolute second rotational position of the DM-device at the time of a respective distance measurement, and generating a layout by consecutively linking the measured distances based on the plurality of measured distance values.

10 Claims, 4 Drawing Sheets

(51) Int. Cl.
*G01C 15/02* (2006.01)
*G01S 7/481* (2006.01)
*G01S 17/36* (2006.01)
*G01S 17/48* (2006.01)

(58) Field of Classification Search
CPC .......... G01S 17/48; G01S 17/88; G01S 17/89; G01C 15/002; G01C 15/02
See application file for complete search history.

(56) References Cited

U.S. PATENT DOCUMENTS

| | | | | |
|---|---|---|---|---|
| 2009/0262974 | A1* | 10/2009 | Lithopoulos | G01C 21/206 356/3 |
| 2013/0179119 | A1* | 7/2013 | Coddington | G01S 17/42 702/159 |
| 2014/0081573 | A1* | 3/2014 | Urmson | G01S 17/42 356/600 |
| 2016/0139269 | A1* | 5/2016 | Yamazaki | G01S 17/88 356/4.01 |
| 2016/0223394 | A1* | 8/2016 | Cook | G02B 27/64 |
| 2017/0123066 | A1* | 5/2017 | Coddington | G01S 17/50 |

OTHER PUBLICATIONS

European Search Report dated Aug. 6, 2018 as received in U.S. Appl. No. 18/157,030.

* cited by examiner

DIRECTION OF CONTINUATION

|  | Roll Position 1 - | Roll Position 2 + |
|---|---|---|
| Yaw CW + | *CCW -* | *CW +* |
| Yaw CCW - | *CW +* | *CCW -* |

DISTANCE MEASURING SYSTEM WITH LAYOUT GENERATION FUNCTIONALITY

CROSS-REFERENCE TO RELATED APPLICATIONS

This application claims priority to European Patent Application No. 18157030.0, filed on Feb. 15, 2018. The foregoing patent application are incorporated herein by reference.

FIELD OF INVENTION

The present invention relates to a Distance Measuring (DM)-system comprising a DM-device and a computer unit. Said DM-device comprises an electromagnetic module and an Inertial Measurement Unit (IMU). The computer unit could be comprised by the DM-device or by a different device, such as a smart phone or a tablet controller which can communicate with the DM-device.

BACKGROUND

Such DM-devices for optical measurement of distances have been known for years and hundreds of thousands of them are used today for a very wide range of applications, in particular in the construction industry. They can be used for optically measuring distances between a measuring stop of the device and a surface region of an object within a distance measuring range from a few decimeters up to, for example, 30 meters with an accuracy of a few millimeters.

In most embodiments, for measuring distances, such DM-devices transmit modulated optical beams via a lens system to the object to be measured. At least part of the transmitted beams is reflected back by the surface region of the object in the direction of the device. Beams reflected by the surface region are collected again via the lens system a distance away from the transmitted beams and are converted by the receiver of the device into an electrical signal. On the basis of the propagation velocity of optical beams, the distance between the measuring stop and the surface region of the object can be determined by evaluating the electrical signal.

It is an object of the present invention to provide a DM-system with improved ergonomics and for saving time and effort when accomplishing surveying tasks. In particular, the DM-system, the method and the computer programme product according to the invention shall achieve to support a user by automatically or semi-automatically generating a coherent layout out of single point measurements acquired with the DM-system.

BRIEF DESCRIPTION OF THE INVENTION

Some aspects of the invention relate to a Distance Measuring (DM)-system comprising a DM-device and a computer unit, said DM-device comprising a measuring beam unit configured for determining a value of a distance between an object and the DM-device by transmitting a measuring beam and receiving a reflection of the measuring beam from the object, and an Inertial Measurement Unit (IMU) configured for determining an absolute first rotational position of the DM-device with respect to a first axis, said first axis being parallel to the measuring beam, and an absolute second rotational position of the DM-device with respect to a second axis, said second axis being parallel to the gravity field, wherein said computer unit is configured for receiving from the DM-device a plurality of measured distance values, for at least one of the plurality of measured distance values, an absolute first rotational position of the DM-device at the time of a respective distance measurement, and for each of the plurality of measured distance values, an absolute second rotational position of the DM-device at the time of a respective distance measurement, and generating a layout by consecutively linking the measured distances based on the plurality of measured distance values, the at least one absolute first rotational position, and the absolute second rotational positions. The IMU may comprise accelerometers for the three dimensions, in particular and at least one of a gyroscope and a magnetometer. The absolute first rotational position may also be described as "roll" and the absolute second rotational position may be described as "yaw". Yaw, however, is understood in terms of a global frame, and roll is understood in terms of a body frame (the body of the DM-device), in particular in case the measuring beam is roughly aligned perpendicular to the gravity field, i.e. roughly aligned along a horizontal plane. In particular, the absolute first rotational position of the DM-device at the time of a respective distance measurement can be receivable by the computer unit for each of the plurality of measured distance values.

The computer unit may be configured for generating the layout iteratively and in such a way that a distance between a starting point of the first measured distance and an endpoint of the last measured distance is minimal.

The computer unit may be configured for receiving, for each of the plurality of measured distance values, a sequence indicator, wherein generating the layout is based on the sequence indicators. Said sequence indicators specify in which order the distance measurements have been provided, which can e.g. be realised with time tags or a plain numbering.

The computer unit may be configured for determining, for each of a second and every further of the plurality of measured distance values, a relative second rotational position with regard to the respective previous measurement, wherein generating the layout is based on the relative second rotational positions.

The computer unit may be configured for determining, for each of the at least one absolute first rotational position, whether one of a first and a second criterion is met, wherein generating the layout is based on the respective met criterion.

The computer unit may be configured for determining, for each of the plurality of measured distance values for which an absolute first rotational position is received, a continuation indicator representing a direction of continuation relative to the respective previous measured distance value based on the respective met criterion, amount and direction of the respective relative second rotational position, and the sequence indicators, and wherein generating the layout is based on the continuation indicator. In particular, the continuation is defined by the sequence indicators. Referring to a top view onto the layout, a direction of continuation is to be understood as where the next wall section (distance value) is "turning" relative to the previous wall section.

Each continuation indicator may be defined by the amount (e.g. angle) and direction of rotation (e.g. an algebraic sign with regard to whether the it is clock-wise or counter-clockwise) of the respective relative second rotational position, and by an algebraic sign provided by the respective met criterion, wherein the first criterion inverts the direction of rotation of the relative second rotational position, and wherein the second criterion confirms the direction of rotation of the relative second rotational position.

The IMU may be configured for determining an absolute third rotational position of the DM-device with respect to a third axis, said third axis being perpendicular to the gravity field and perpendicular to the measuring beam, wherein generating the layout is based on measured distance values for which the third rotational position of the DM-device at the time of the respective distance measurement is within a predetermined range comprising a horizontal plane. The absolute third rotational position may also be described as "pitch". By this functionality, the computer unit may determine or "confirm" that the measured distance value belongs to a horizontal wall section of a room.

The computer unit may be configured for generating a three-dimensional model based on the layout and a measured distance value for which the third rotational position of the DM-device at the time of the respective distance measurement is within a range comprising the vertical. In other words, the absolute third rotational position may act as an indicator for the computer unit to determine or decide whether the DM-device is pointing upwards or downwards and hence whether it is measuring a height of a room.

The computer may also be configured for optimising the layout by adjusting the continuation indicator in such a way that a distance between a starting point of the first measured distance and an endpoint of the last measured distance is zero. In other words, this optimisation functionality links the beginning and the end of the layout to exactly result in a closed layout by adjusting the angles of the corners and/or edges of the layout.

Some aspects of the invention also relate to a method of generating a layout with a DM-system according to the description herein, said method comprising, with the DM-device, providing the computer unit with a plurality of measured distance values, for at least one of the plurality of measured distance values, with an absolute first rotational position of the DM-device at the time of a respective distance measurement, for each of the plurality of measured distance values, with an absolute second rotational position of the DM-device at the time of a respective distance measurement, and with the computer unit, generating a layout by consecutively linking the measured distances based on the plurality of measured distance values, the at least one absolute first rotational position, and the absolute second rotational positions.

The step of generating the layout may be performed iteratively and in such a way that a distance between a starting point of the first measured distance and an endpoint of the last measured distance is minimal.

The method may further comprise, with the DM-device, providing the computer unit for each of the plurality of measured distance values, with a sequence indicator, wherein generating the layout is based on the sequence indicators.

The method may further comprise, with the computer unit determining, for each of a second and every further of the plurality of measured distance values, a relative second rotational position with regard to the respective previous measurement, wherein generating the layout is based on the relative second rotational positions.

The method may further comprise, with the computer unit, determining, for each of the at least one absolute first rotational position, whether one of a first and a second criterion is met, and wherein generating the layout is based on the respective met criterion.

The method may further comprise, with the computer unit, determining, for each of the plurality of measured distance values for which an absolute first rotational position is received, a continuation indicator representing a direction of continuation relative to the respective previous measured distance value based on the respective met criterion, amount and direction of the respective relative second rotational position, and the sequence indicators, wherein generating the layout is based on the continuation indicator.

Each continuation indicator may be defined by the amount and direction of rotation of the respective relative second rotational position, and by an algebraic sign provided by the respective met criterion, wherein the first criterion inverts the direction of rotation of the relative second rotational position, and wherein the second criterion confirms the direction of rotation of the relative second rotational position. The algebraic sign provided by the respective met criterion may be considered a "corrective" factor for the yaw (relative second rotational position).

The method may further comprise, with the IMU, determining an absolute third rotational position of the DM-device with respect to a third axis, said third axis being perpendicular to the gravity field and perpendicular to the measuring beam, and wherein generating the layout is based on measured distance values for which the third rotational position of the DM-device at the time of the respective distance measurement is within a predetermined range comprising a horizontal plane.

The method may further comprise, with the computer unit, generating a three-dimensional model based on the layout and a measured distance value for which the third rotational position of the DM-device at the time of the respective distance measurement is within a range comprising the vertical.

The method may further comprise, with the computer unit, optimising the layout by adjusting the continuation indicator in such a way that a distance between a starting point of the first measured distance and an endpoint of the last measured distance is zero.

The invention further relates to a computer programme product comprising program code stored on a machine-readable medium, or computer-data-signal embodied as an electromagnetic wave, for executing a method according to the description herein, in particular executed in a computer unit of a DM-system according to the description herein.

DESCRIPTION OF THE DRAWINGS

In the following, the invention will be described in detail by referring to exemplary embodiments that are accompanied by figures, in which.

DETAILED DESCRIPTION

Figures 1, 2:
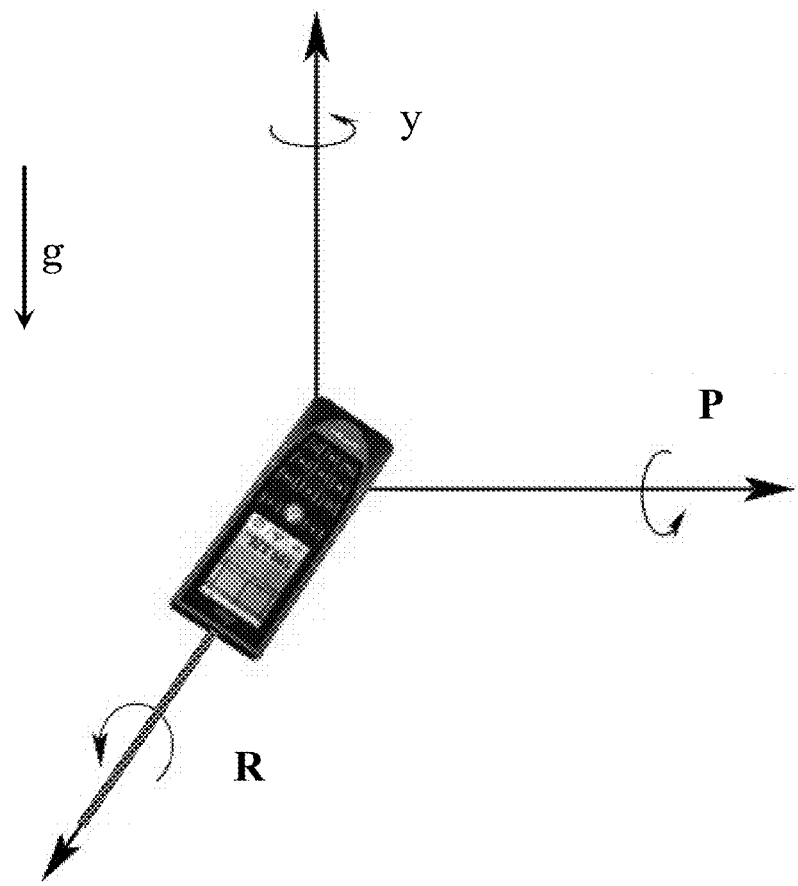
FIG. 1: shows a DM-device according to an embodiment of the invention, a yaw axis (world frame), a roll axis (body frame), and a pitch axis (body frame)
FIG. 2: shows a rule for determining the direction of continuation of a wall section according to one embodiment of the invention.

FIG. 1 shows a Distance Measuring (DM)-device, also referred to as distance meter, according to an exemplary embodiment of the invention. Such devices are in principle known from the Leica DISTO™ product line.

In a conventional version, a laser beam is used to measure a distance between the DM-device and an object. In particular, a laser signal is emitted and a laser signal backscattering from the object is received by the DM-device. Based on the principle of Time of Flight (TOF), a distance can be determined very accurately.

The determined distance can refer to the front edge of the DM-device or the back edge or any static or dynamic reference marker on the DM-device. In this way, the DM-device is variable with respect its way of usage during a measurement. In particular, the place a distance measurement shall refer to, can be set in a User Interface (UI) of the DM-device.

However, a DM-device according to the invention is not restricted to such an embodiment and may work based on radiation other than laser, e.g. sonic waves.

The DM-device can have a computer unit and/or can be connected (via a wired or wireless data connection) to such a computer unit carried by another external device, such as a smart phone or tablet controller. The computer unit may also be arranged in a stationary computer, e.g. such as a server at a construction site.

According to the invention, such computer unit is configured for generating a coherent layout of a room based on a plurality of measured distances and the output of an Internal Measurement Unit (IMU) of the DM-device. In particular, the computer unit is configured for generating a three-dimensional model of the room based on the generated layout and at least one further measured distance value representing the height of the room. These functionalities will be explained by means of the following figures.

When measuring a first distance, it is not known how this wall section is aligned relative to the previous one. When a second distance, i.e. a second wall section, is measured, the relative yaw movement is detected that took place between the two measurements. This relative yaw (relative second rotational position) is a rough indicator for the direction of continuation of the wall sections. However, when generating the layout, there may be introduced some ambiguities with regard to which direction the next wall section is aligned to relative to the previous one.

FIG. 2 shows an exemplary rule on the basis of which the computer unit may bring more certainty into the process of generating the layout, i.e. how the measured distances are to be linked in order to generate the coherent layout. This selection decision can be applied every time a criterion is met during a distance measurement. A first criterion according to this example is that the roll is in position 1 (which inverts the measured yaw by means of a negative factor) and a second criterion is that the roll is in position 2 (which confirms the measured yaw by means of a positive factor).

The computer unit can use this table in case any of the criteria is met. Position 1 may be defined as the display of the DM-device facing towards the wall, when measuring to the left, or facing towards the inside of the room when measuring to the right (left and right from a users perspective, the user facing the wall).

Position 2 may be defined as the display of the DM-device facing away from the wall (towards the inside of the room), when measuring to the left. In other words, position 2 may be defined as the display of the DM-device facing towards the wall when measuring to the right.

As can be understood, the IMU can determined such orientations which are a matter of definition.

Instead of a position (1/2), also a range of rotational positions may be defined as meeting the respective criterion. Instead of the display, any other reference element of the DM-device may be used for such position definition.

When the user can already anticipate that ambiguity could emerge in the algorithm, he can deliberately perform such measurements while giving the DM-device a certain position. For example, position 2 is defined as increasing certainty in that the measured yaw is correct, and position 1 is defined as increasing certainty in that the measured yaw should be inverted.

In this example, should a measured distance value be assigned to an absolute first rotational position (roll), which meets criterion "roll position 2", then this measured distance value is given more weight in the process of generating the layout. This could be realised with an according confirmative continuation indicator.

Measured distance values which are not accompanied with an absolute first rotational position (e.g. when the display of the DM-device faces upwards or downwards) can be weighted less strongly as being a candidate for which the direction of continuation could be clock-wise or counter-clock-wise. An iterative process can find out what was more plausible by checking under which combination the distance between the beginning point and the ending point is the smallest.

Should a measured distance value be assigned to an absolute first rotational position (roll), which meets criterion "roll position 1", then this measured distance value is given more weight in the process of generating the layout. This could be realised with an according inverted continuation indicator.

Roll (or roll angle) can be defined as a first rotational position of the DM-device with respect to a first axis, said first axis being parallel to the measuring beam. In other words, the first axis has its reference in the body frame (the body of the DM-device).

Yaw (or yaw angle) can be defined as a second rotational position of the DM-device with respect to a second axis, said second axis being parallel to the gravity field. In other words, the second axis has its reference in the world frame (independent from the DM-device).

If yaw was changed clock-wise (CW) relative to the previous measurement (indicated with a "plus"-sign), and a criterion is met, the computer unit may look up in the upper row of the table. If yaw was changed counter-clock-wise (CCW) relative to the previous measurement (indicated with a "minus"-sign), and a criterion is met, the computer unit may look up in the lower row of the table.

So, to give one example, if the pose of the DM-device during a certain measurement relative to the pose of the DM-device during the previous measurement is such that roll is in the confirmative position 2 and yaw turned counter-clock-wise, then the computer unit may give more weight to the assumption that the presently measured distance offsets from the previous distance in a direction counter-clock-wise.

In other words, depending on a predetermined roll position, it can be decided more clearly whether the determined yaw is correct or should be inversed. In a preferred embodiment, a criterion would be met with every measurement, making the process of generating the layout most stable.

Figure 3:
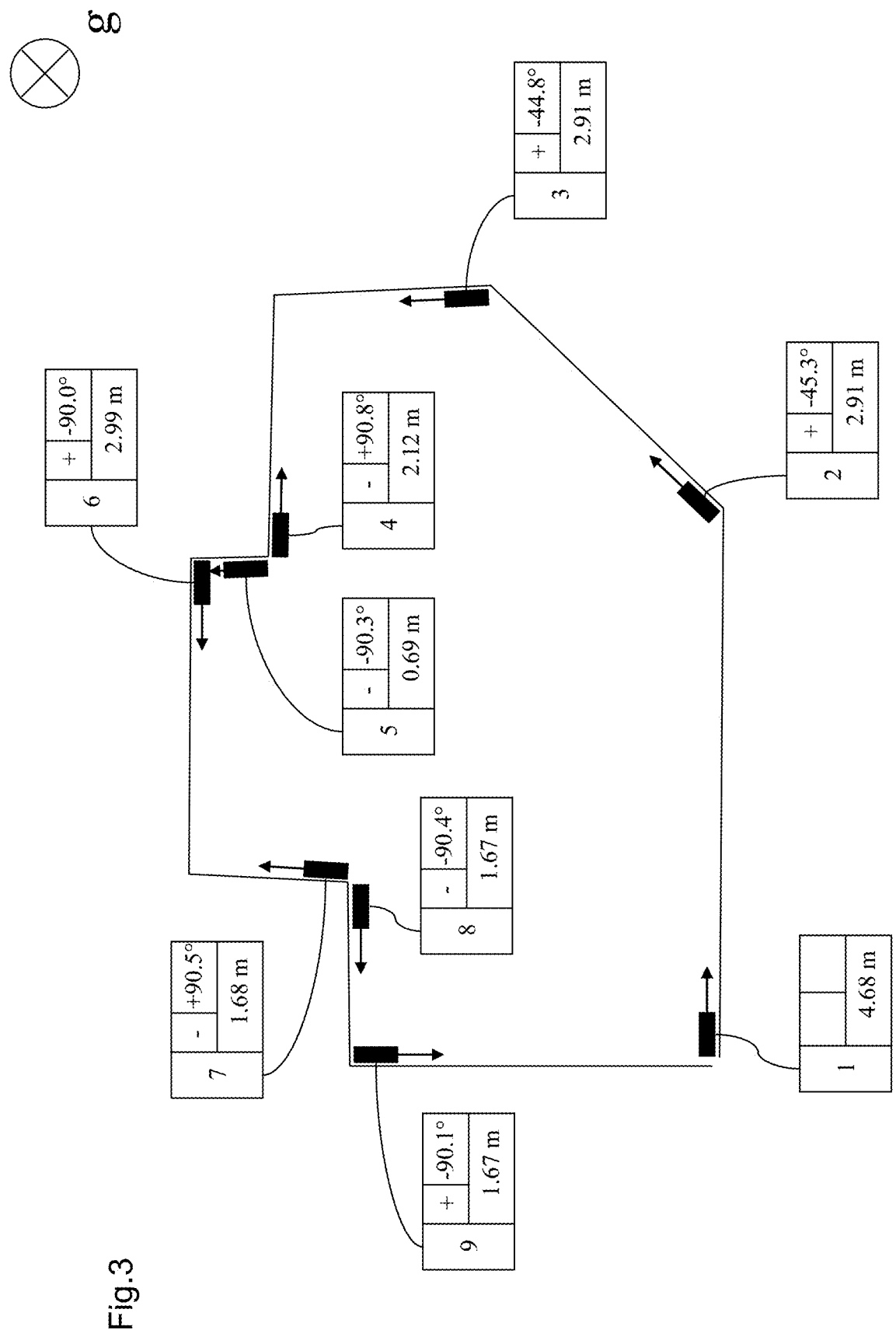
FIG. 3: shows a plurality of distance measurements alongside the walls of a room from a top view on the basis of which a system according to an embodiment of the invention is configured to generate a coherent layout of said room.

FIG. 3 shows the single measurements of an exemplary room survey, wherein the computer unit may generate the layout of the room. The room is shown from a top view, and the lines of the wall sections indicate the distances or lengths of said sections as the DM-device captured them. As a common usage of generic devices, the DM-device is positioned against the edge to another wall section in order to have a reference as starting point. That is, at the first measurement position 1, the DM-device is held with its back end against the wall section (see 9; will be measured at the end) proceeding in a 90° angle from the section that is presently measured. In the example shown in FIG. 3, all measurements are taken like this and the DM-device is set up as to record the distances with its back end as starting point reference. However, it is also possible to use the front end of the DM-device as a stop to hold against the edge depending on the situation (e.g. in measurement 4, 5, 7, and 8), wherein the DM-device has a functionality to set the reference from the back end to the front end. Alternatively, any place on the DM-device between the back end and the front end could function as reference. For example, in an embodiment of the DM-device, a display on the DM-device could show a marking at any place desirable.

The shown measurements all take place while a certain side of the DM-device is facing away from the wall. However, according to the invention, this specific alignment of the DM-device does not necessarily take place for every measurement. The layouting can be improved by receiving at least one absolute first rotational position, which is checked if it meets one of the above mentioned criteria.

If the DM-device has e.g. a display and/or a keypad, that could be a preferable side to use as a reference, i.e. to face in a predefined direction relative to the wall. Proceeding like this, the computer unit can determine by the rule shown in FIG. 2 that during measurement 2 (and also during measurement 3, 6, and 9) the roll is in a confirmative position, because the side with the display is facing away from the wall.

Now, in measurement 4 that has changed because this measurement is taken "backwards" in order to avoid using a target plate. That is, if this measurement would be taken from the upper right corner (such that the roll would still be in position 2), a target plate would have to be placed at the edge on the left (where the DM-device is placed for measurement 5). Since a further person to hold the plate or a fixture means would be needed, this step can be simplified in that the measurement is done from the edge "backwards". This results in the roll being in position 1, i.e. the DM-device is flipped over.

Since the roll is reversed when looking at measurement 4 relative to measurement 3, the computer unit inverses the relative yaw angle of the DM-device in measurement position 3 vs. measurement position 4. Said relative yaw angle is per se clock-wise, however due to the reversal, the computer unit knows that the wall section actually took a turn counter-clock-wise when going from 3 to 4.

The same is true between measurements 4 and 5. The raw data from the yaw angle detection indicate that a turn in the counter-clock direction would take place with respect to the lengths measured at 4 and 5. However, in reality, wall section 5 makes a clock-wise turn relative to wall section 4. Because the DM-device does a flip over with respect to the first axis when considering measurement position 4 relative to measurement position 5, the determined relative rotational position (yaw) is inverted and the correct layout is drawn.

Whenever the yaw position is confirmed or inverted, this direction of continuation will be regarded more likely to be true (more plausible) in generating the layout.

Figure 4:
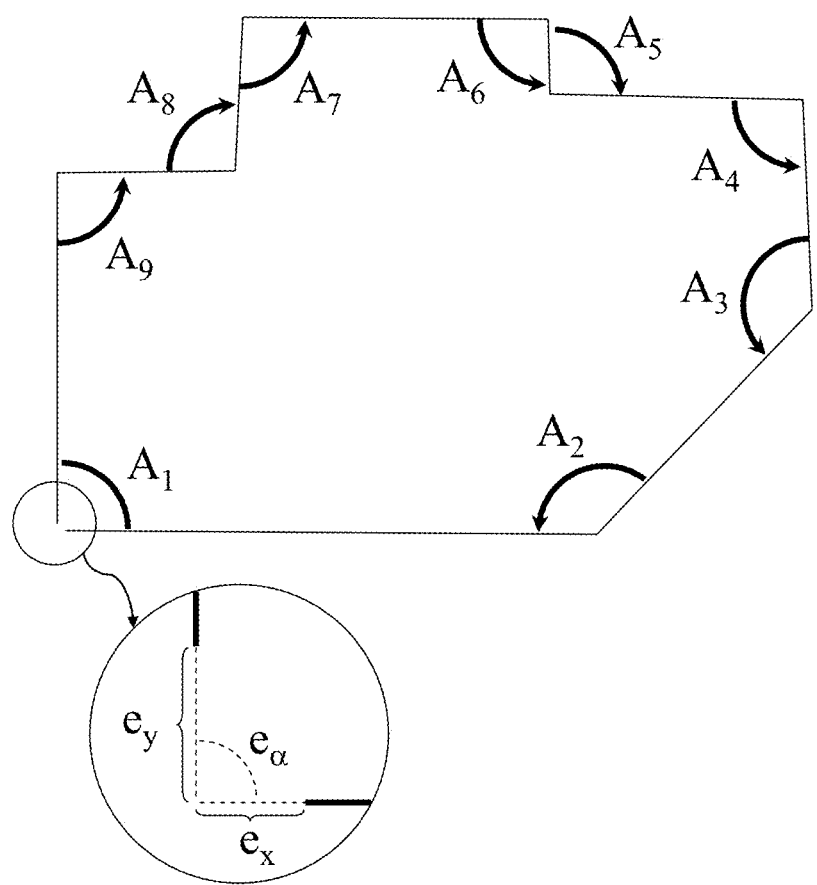
FIG. 4: shows items which are involved in a layout optimisation according to a particular embodiment of the invention.

Due to imperfect measurements, it is possible that a small gap is resulting in the layout. FIG. 4 shows a detailed view of this gap having two longitudinal and an angle error component. With an optional layout optimisation functionality, this gap can be closed by adjusting the angles $A_1$ to $A_9$. The distances are considered to be correct, that is why only the angles are adjusted.

For example, the optimisation functionality can be based on the assumption that angles rather close to certain predetermined angles, such as +90° and −90°, are set or iteratively approached to such "perfect" angles, until the gap is closed. Rather "special" angles such as $A_2$ and $A_3$ can optionally be excluded from this regenerating of the layout and all errors "shifted" into $A_2$ and $A_3$, all other angles being set to the perfect +90° and −90°.

Figure 5:
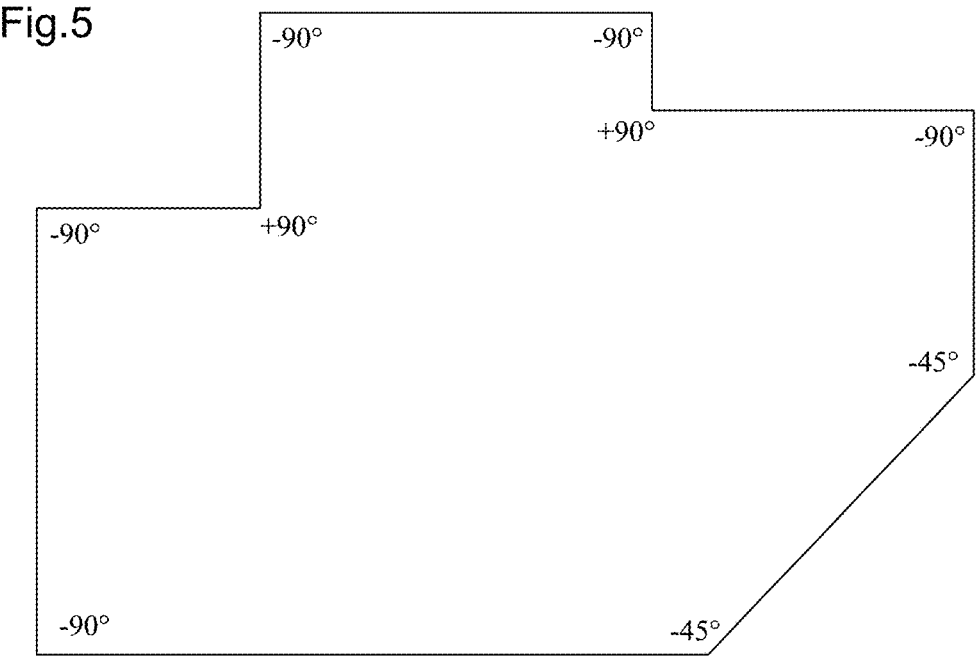
FIG. 5: shows an optimised layout as a result of a layout optimisation according to a particular embodiment of the invention.

Even if in reality the angles between the wall sections are never perfectly built rectangularly and always have some deviation, a layout resulting from the optimisation functionality as shown in FIG. 5 may result in having "perfect" angles which of course have in sum −360°.

Figure 6:
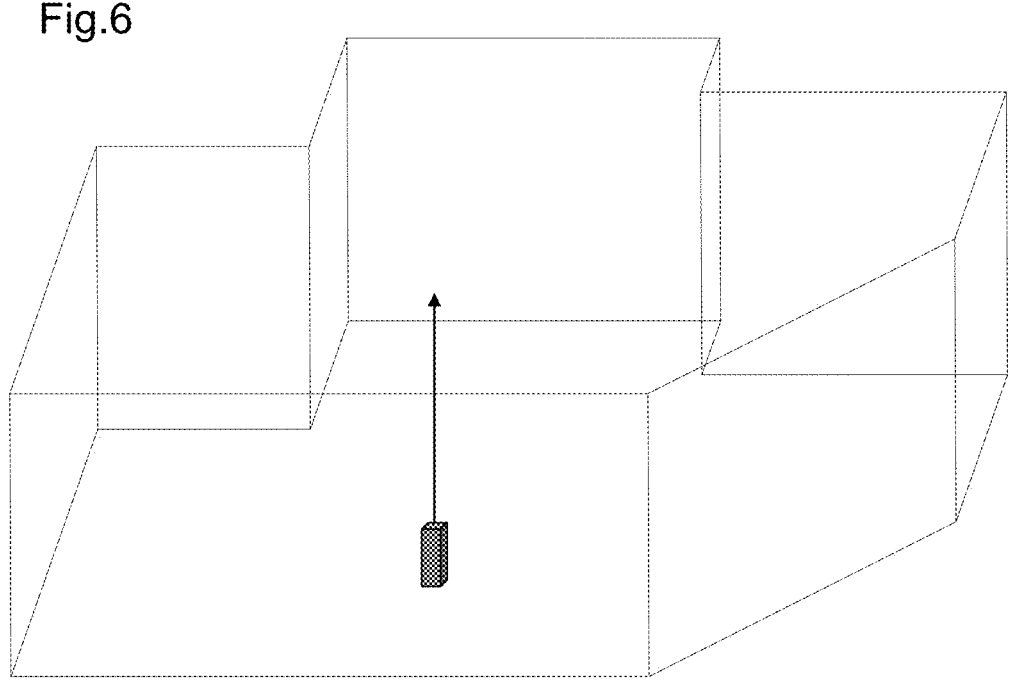
FIG. 6: shows an the layout of FIG. 5 or 3 getting a third dimension by one vertical measured distance value in order to form a 3D-model.

FIG. 6 shows another embodiment of the invention wherein the layout of FIG. 5 (optimised) or 3 (not optimised) can get the third dimension resulting in a 3D-model of the room by measuring at least on time the distance between the floor and the roof.

The computer unit can be configured to automatically detect this measured distance value as the height of the room by monitoring the IMU. In this case, at the time of measurement, an absolute third rotational position of the DM-device with respect to a third axis (said third axis being perpendicular to the gravity field and perpendicular to the measuring beam) is within a range comprising a vertical axis (parallel to gravity field). In more simple words, when the DM-device is showing up or down, the computer unit detects the current measurement as the ceiling height and accordingly generates a 3D-model. If the 2D-layout is not yet finished, the computer unit keeps the determined height "in mind" and generates the 3D-model, when the layout is done.

Accordingly, the computer unit can detect all horizontal (wall section) measurements as such by reading the IMU and detecting the third rotational position as being within a predetermined range around a horizontal plane (perpendicular to the gravity field). This automatic recognition functionality (whether the measured length is horizontal or vertical) is optional. In a more general embodiment of the invention, it is assumed that the measurements are horizontal, and the vertical component could be added after finalising the layout.

From a different perspective, the invention could alternatively be described as follows:

The invention relates to a room-layout-generation computer program product stored on a computer unit, adapted to be used in conjunction with a handheld EDM module built for determining a distance along a measurement axis,
inertial and absolute orientation values with respect to gravity and the magnetic earth field, the room-layout-generation computer program carries out a room-layout-generation functionality, which is run at least in part automatically, for which room-layout-generation functionality a procedure of N wall measurements is defined, which wall measurements are to be performed in a respective alignment of the handheld EDM module and in the sequence of the succession of the walls of the room, and wherein in the context of the room-layout-generation functionality the computer unit is receiving and registering, for each of the N wall measurements, an n-th measured distance, n-th measured inertial and absolute orientation values and wherein the computer unit is automatically generating room layout based on the respective n-th data, with the use of the given sequence of the wall measurements, the respectively assigned inertial and absolute orientations, and an optimisation algorithm, wherein said optimisation algorithm is optimising a closing of the beginning and the ending of the wall path (i.e. a delta between the beginning and the ending is minimised) based on a variation of algebraic signs of the direction of the single walls, and additionally considering a criterion when choosing the respective algebraic sign, which criterion is based on an expected orientation of the handheld EDM module relative to the wall depending on the measured inertial and absolute orientations.

The layout may be computed once all measurements are done. Then an optimizer may be "trying" to find the room shape, based on the sequence for the measurement lines by considering the orientation of the display. If the display is facing towards the room it is highly likely, that this orientation is correct.

The computation of deciding whether a line is measured forward or backward may be done within an app(lication). This computation may particularly be done if the user measured all distances and then presses "close room". Then the optimiser may try various directions of each and every line, by weighting directions where the display is facing the room, more heavily within the optimisation, than measurements where the display is facing the ceiling. The measurements where the display is facing the wall, can be weighted the least (or are weighted heavy in that they are wrong or inverted).

In addition, the optimisation may be based on the "failure distance" where the room is not closing between the last and the first line without changing the yaw angles. This distance is optimised to be the smallest possible distance, by only modifying the yaw angles, towards preferable angles (e.g. 90°) and the closing distance equals zero. For cases in which more than one equivalent solution for the closing optimisation are existing, the criterion may effectively be considered. N-th measured inertial and absolute orientation values may be translated into a yaw-angle relative to a room system, and the respective n-th yaw-angles may then be considered in the calculation of the respective angles, which are defined by two neighbouring walls.

N-th measured inertial and absolute orientation values may be translated into a pitch-angle relative to a room system, and the respective pitch-angles may then be considered for a tilt-compensation of the measured distance values, such that the horizontal wall length is determined.

N-th measured inertial and absolute orientation values may be translated into a roll-angle of the handheld EDM module relative to a room system, and the respective n-th roll-angles may then be considered when "flipping" the wall directions, in particular within the criterion.

The invention further relates to a system comprising a computer unit according to the above description and a handheld EDM module built for determining a distance along a measurement axis, inertial and absolute orientation values with respect to gravity and the magnetic earth field, wherein a data communication connection is provided between the computer unit and the handheld EDM module, and wherein the measured values from the n-th wall measurement are transmitted to the computer unit.

Said computer unit and said handheld EDM module may together form one handheld device, which has one housing. The handheld EDM module may also be integrated into a handheld device and the computer unit may be integrated in a remote device, in particular a smart phone or a tablet.

Although the invention is illustrated above, partly with reference to some preferred embodiments, it must be understood that numerous modifications and combinations of different features of the embodiments can be made. All of these modifications lie within the scope of the appended claims.

What is claimed is:

1. A Distance Measuring (DM)-system comprising:
   a DM-device including:
      a measuring beam unit configured for determining a value of a distance between an object and the DM-device by transmitting a measuring beam and receiving a reflection of the measuring beam from the object, and
      an Inertial Measurement Unit (IMU) configured for determining:
         an absolute first rotational position of the DM-device with respect to a first axis, said first axis being parallel to the measuring beam, and
         an absolute second rotational position of the DM-device with respect to a second axis, said second axis being parallel to the gravity field,
   a computer unit configured for:
      receiving from the DM-device:
         a plurality of measured distance values,
            for at least one of the plurality of measured distance values, an absolute first rotational position of the DM-device at the time of a respective distance measurement, and
            for each of the plurality of measured distance values, an absolute second rotational position of the DM-device at the time of a respective distance measurement, and
      generating a layout by consecutively linking the measured distances based on the plurality of measured distance values, the at least one absolute first rotational position, and the absolute second rotational positions, and
      generating the layout iteratively and in such a way that a distance between a starting point of the first measured distance and an endpoint of the last measured distance is minimal.

2. A method of generating a layout with a DM-system according to claim 1, said method comprising:
   with the DM-device, providing the computer unit:
      with a plurality of measured distance values,
      for at least one of the plurality of measured distance values, with an absolute first rotational position of the DM-device at the time of a respective distance measurement,
      for each of the plurality of measured distance values, with an absolute second rotational position of the DM-device at the time of a respective distance measurement, and
   with the computer unit, generating a layout by consecutively linking the measured distances based on the plurality of measured distance values, the at least one absolute first rotational position, and the absolute second rotational positions, wherein generating the layout is performed iteratively and in such a way that a distance between a starting point of the first measured distance and an endpoint of the last measured distance is minimal.

3. The method according to claim 2, further comprising: with the DM-device, providing the computer unit with a sequence indicator for each of the plurality of measured distance values, wherein the sequence indicators specify an order that the distance measurements are provided, wherein generating the layout is based on the sequence indicators.

4. The method according to claim 3, further comprising: with the computer unit, determining, for each of a second and every further of the plurality of measured distance values, a relative second rotational position with regard to the respective previous measurement, wherein generating the layout is based on the relative second rotational positions.

5. A computer programme product comprising program code stored on a machine-readable medium, or a non-transitory computer-data-signal, for executing a method according to claim 2.

6. A Distance Measuring (DM)-system comprising:
a DM-device including:
  a measuring beam unit configured for determining a value of a distance between an object and the DM-device by transmitting a measuring beam and receiving a reflection of the measuring beam from the object, and
  an Inertial Measurement Unit (IMU) configured for determining:
    an absolute first rotational position of the DM-device with respect to a first axis, said first axis being parallel to the measuring beam, and
    an absolute second rotational position of the DM-device with respect to a second axis, said second axis being parallel to the gravity field,
a computer unit configured for:
  receiving from the DM-device:
    a plurality of measured distance values,
      for at least one of the plurality of measured distance values, an absolute first rotational position of the DM-device at the time of a respective distance measurement, and
      for each of the plurality of measured distance values, an absolute second rotational position of the DM-device at the time of a respective distance measurement,
  generating a layout by consecutively linking the measured distances based on the plurality of measured distance values, the at least one absolute first rotational position, and the absolute second rotational positions,
  receiving, for each of the plurality of measured distance values, a sequence indicator, and wherein generating the layout is based on the sequence indicators, wherein the sequence indicators specify an order that the distance measurements are provided, and
  determining, for each of the at least one absolute first rotational position, whether one of a first criterion or a second criterion is met, and wherein generating the layout is based on the respective met criterion, wherein the first criterion inverts a direction of rotation of the relative second rotational position, and
wherein the second criterion confirms the direction of rotation of the relative second rotational position.

7. The DM-system according to claim 6, wherein the computer unit is further configured for determining, for each of a second and every further of the plurality of measured distance values, a relative second rotational position with regard to the respective previous measurement, and wherein generating the layout is based on the relative second rotational positions.

8. A Distance Measuring (DM)-system comprising:
a DM-device including:
  a measuring beam unit configured for determining a value of a distance between an object and the DM-device by transmitting a measuring beam and receiving a reflection of the measuring beam from the object, and
  an Inertial Measurement Unit (IMU) configured for determining:
    an absolute first rotational position of the DM-device with respect to a first axis, said first axis being parallel to the measuring beam, and an absolute second rotational position of the DM-device with respect to a second axis, said second axis being parallel to the gravity field,
a computer unit configured for:
  receiving from the DM-device:
    a plurality of measured distance values, for at least one of the plurality of measured distance values, an absolute first rotational position of the DM-device at the time of a respective distance measurement, and for each of the plurality of measured distance values, an absolute second rotational position of the DM-device at the time of a respective distance measurement,
  generating a layout by consecutively linking the measured distances based on the plurality of measured distance values, the at least one absolute first rotational position, and the absolute second rotational positions,
  receiving, for each of the plurality of measured distance values, a sequence indicator, and wherein
    generating the layout is based on the sequence indicators, wherein the sequence indicators specify an order that the distance measurements are provided, and
  determining, for each of the plurality of measured distance values for which an absolute first rotational position is received, a continuation indicator representing a direction of continuation of a subsequent measured distance value of a subsequent object relative to the respective previous measured distance value of a previous object based on:
    a respective met criterion, wherein the first criterion inverts the direction of rotation of the relative second rotational position, and wherein the second criterion confirms the direction of rotation of the relative second rotational position,
    amount and direction of the respective relative second rotational position, and
    the sequence indicators, and
  wherein the direction of continuation is a rotation to the subsequent object relative to the previous object, and the continuation indicator is a value of the rotation, wherein generating the layout is based on the continuation indicator.

9. The DM-system according to claim 8, wherein each continuation indicator is defined by the amount and direction of rotation of the respective relative second rotational position, and by an algebraic sign provided by the respective met criterion.

10. A Distance Measuring (DM)-system comprising:
a DM-device including:
    a measuring beam unit configured for determining a value of a distance between an object and the DM-device by transmitting a measuring beam and receiving a reflection of the measuring beam from the object, and
    an Inertial Measurement Unit (IMU) configured for determining:
        an absolute first rotational position of the DM-device with respect to a first axis, said first axis being parallel to the measuring beam, and
        an absolute second rotational position of the DM-device with respect to a second axis, said second axis being parallel to the gravity field,
a computer unit configured for:
    receiving from the DM-device:
        a plurality of measured distance values,
            for at least one of the plurality of measured distance values, an absolute first rotational position of the DM-device at the time of a respective distance measurement, and
            for each of the plurality of measured distance values, an absolute second rotational position of the DM-device at the time of a respective distance measurement,
    generating a layout by consecutively linking the measured distances based on the plurality of measured distance values, the at least one absolute first rotational position, and the absolute second rotational positions, and
    optimising the layout by adjusting the continuation indicator in such a way that a distance between a starting point of the first measured distance and an endpoint of the last measured distance is zero,
wherein the continuation indicator represents a direction of continuation of a subsequent measured distance value of a subsequent object relative to the respective previous measured distance value of a previous object and the direction of continuation is a rotation to the subsequent object relative to the previous object, and the continuation indicator is a value of the rotation, and
wherein the adjusting changes measured angles for each direction of continuation.

* * * * *